(No Model.)
F. J. FISCHER.
Hoe.
No. 232,700.      Patented Sept. 28, 1880.
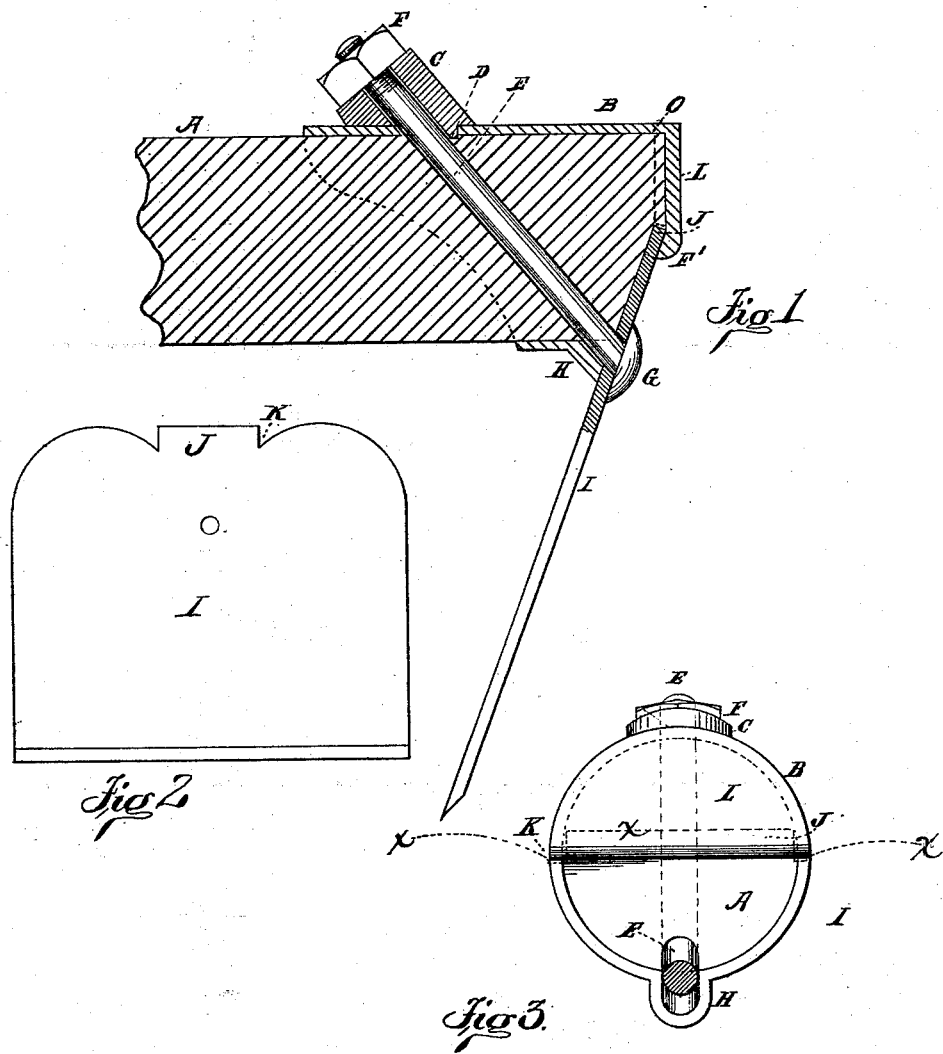
WITNESSES:
INVENTORs,
Francis J. Fischer
ATTORNEY.

UNITED STATES PATENT OFFICE.

FRANCIS J. FISCHER, OF HAMILTON, OHIO.

HOE.

SPECIFICATION forming part of Letters Patent No. 232,700, dated September 28, 1880.

Application filed June 4, 1880. (No model.)

*To all whom it may concern:*

Be it known that I, FRANCIS J. FISCHER, of Hamilton, Butler county, and State of Ohio, have invented a new and useful Improvement in Hoes, of which the following is a full, clear, and exact description, reference being had to the accompanying drawings, and to the letters of reference marked thereon.

In the drawings, Figure 1 represents a central section of the hoe complete. Fig. 2 represents the hoe-blade detached, and Fig. 3 represents the under side or bottom of the ferrule and handle, the blade being removed.

The ferrule B is made with a seat, L, for the handle A, which seat is a semi-disk provided with lip F', to receive the tongue J of blade I, as represented by dotted lines $x$ at K, Fig. 3.

The bolt E is made with its head G arranged at the proper angle to fit snugly upon the blade I and to hold it firmly to the ferrule. The bolt also secures the handle A to both the ferrule and the blade by passing up through the blade I and within the front part of the ferrule, thence through the handle and the hole in the rear part of the ferrule, as shown at Fig. 1.

The parts are rigidly fastened together by means of the nut F and washer C, which has a concave inner face to correspond with the outer surface of the ferrule, to which it fits, and the washed C is also provided with a tooth, D, which enters the hole in the rear side of the ferrule, which hole is made of sufficient size to receive both the screw-bolt E and tooth D of the washer.

The seat L may be made of a thickness indicated by dotted line O, so as to form a support for the rear edge of tongue J, which is placed between lip F' and the ferrule.

To confer greater strength to the fastening and to retain the parts in their relation, the front of the ferrule B may be enlarged, as shown at H, and thereby a brace will be provided for the blade and handle.

The inner side of the brace H may be grooved to receive the bolt E.

The tooth D, on washer C, resting in the bolt-hole of ferrule B, will prevent the washer and nut from slipping downward when the nut F is screwed down.

It is apparent that blades and tools of different shapes may be readily secured to the handle by the mechanism described.

The hoe-blade may be reversed in position to bring its bevel at the edge, either above or beneath in its relation to the ferrule and handle, which will adapt the implement for various kinds of work.

Having described my improvement in hoes, I claim and desire to secure by Letters Patent—

The ferrule B, provided with the seat L and overhanging lip F' across its lower end, in combination with the blade I, provided with the tongue J, fitting between the sides of the ferrule, substantially as and for the purpose herein specified.

Witness my hand this 10th day of May, 1880.

F. J. FISCHER.

Witnesses:
LOUIS HARMYER,
CHAS. BRAMSCHE.